Patented Sept. 23, 1924.

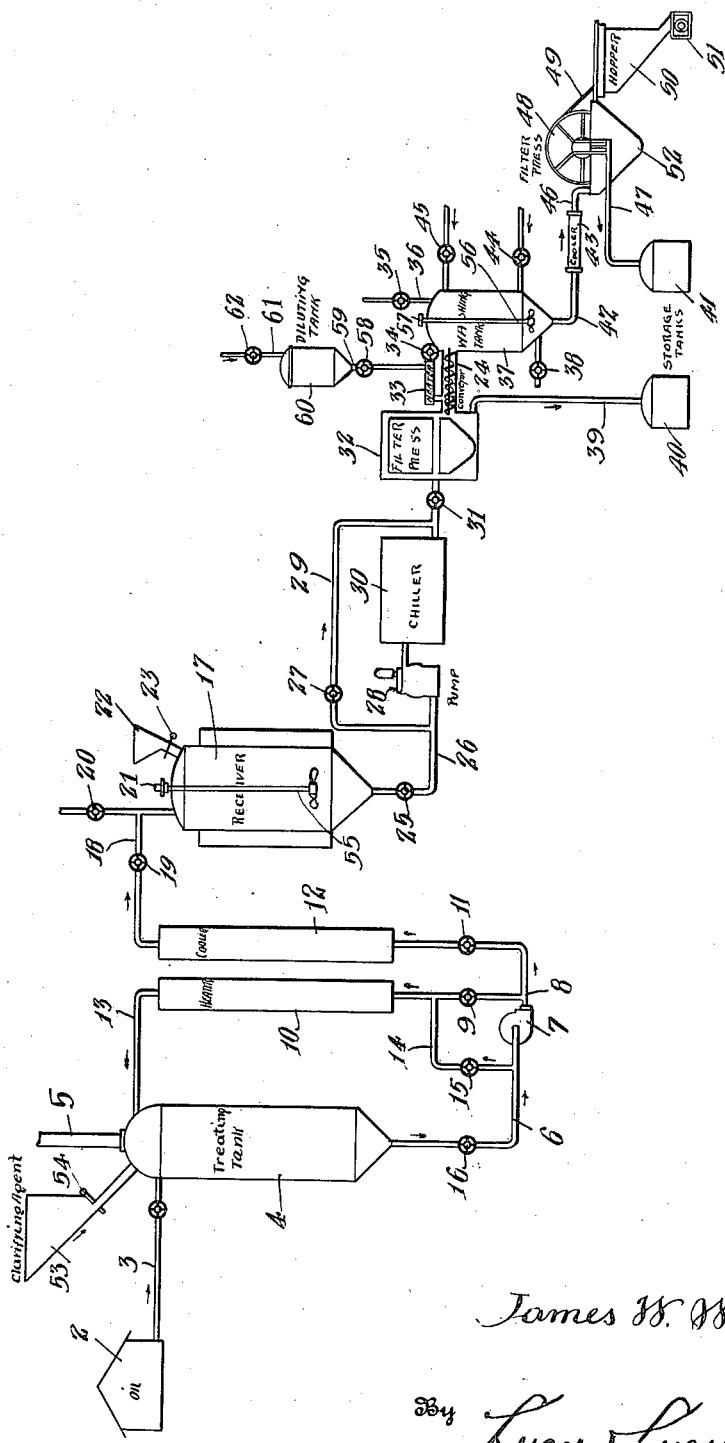

1,509,326

UNITED STATES PATENT OFFICE.

JAMES W. WEIR, OF FILLMORE, CALIFORNIA.

METHOD OF TREATING PETROLEUM OIL.

Application filed June 11, 1924. Serial No. 719,341.

*To all whom it may concern:*

Be it known that I, JAMES W. WEIR, a citizen of the United States, residing at Fillmore, in the county of Ventura and State of California, have invented a new and useful Method of Treating Petroleum Oil, of which the following is a specification.

This invention relates to the treatment of petroleum oils and refers particularly to a method of purifying lubricating oils to effect a plurality of different purifying actions by a sequence of operations effected by the aid of an agent common to each of the purifying actions.

By well known methods petroleum oils such as lubricating oils have been purified, for example clarified and decolorized, by filtering through or agitating the oil with a comminuted clay or earthy purifying material such for example as montmorillonite. It is found that after such treatment has been applied to certain petroleum oils paraffin wax remains in the treated oil. In the manufacture of various petroleum products, such as lubricating oil from petroleum oil, it is desirable to free the lubricating oil from the major portion of the paraffin wax which may exist in the oil either in crystalline or amorphous form.

An object of the present invention is to provide a process in which the paraffin wax may be separated from petroleum oils after a purifying action, such as a clarifying and decolorizing action, without interfering with or substantially retarding the speed or efficiency of such purifying action or treatment.

I have found that if petroleum oil is treated with a comminuted clay or earthy material such as are well known in this art to first purify or clarify and decolorize the oil and then the treating agent left in the mixture while the mass is cooled below the melting point of the paraffin wax, the paraffin wax will be disseminated throughout the purifying or treating agent and the oil may then be separated from the mass by filtering at a temperature below the melting point of paraffin wax. In this manner I am able to perform a plurality of different purifying actions upon the oil through the aid of a substance or agent operating in each of the purifying reactions and thus provide a purified petroleum oil freed from paraffin wax without retarding or destroying the efficiency of other purifying action or reactions.

Another object of the invention is to provide a method for separating paraffin wax or other hydrocarbon which solidify or become semi-solid at temperatures less than 140° F. from petroleum oils, which method may be carried out concurrently with a decolorizing process employing high temperatures and in which the decolorizing agent acts upon the oil by the contact or agitating method and in which the decolorizing agent employed in the contact decolorizing operation may be utilized as a wax adherent medium in the dewaxing operation.

I have also found that, when utilizing the purifying or decolorizing agent left remaining in the oil after a previous purifying action as a wax adherent medium in the separation of paraffin wax from petroleum oils, such separation can be greatly facilitated by the addition of further wax adherent medium, as the wax separation operation frequently requires a greater quantity of material than is necessary for previous purifying action. This further wax adherent medium may be, and preferably is, a material having no decolorizing properties such as diatomaceous earth, sand or the like, the diatomaceous earth being found of particular value in disseminating the wax and permitting a separation of the petroleum oil from the solid mass.

In my copending application, Serial Number 390,417, filed June 21, 1920, a process is described in which diluted lubricating oil stock is filtered at a reduced temperature in the presence of a wax adherent medium. The latter medium may be any comminuted solid capable of permitting or inducing adhesion of the congealed wax thereto to separate the oil from its paraffin wax content. This invention is an improvement on the said pending application in that the petroleum oil containing paraffin wax is first subjected to a purifying action by contacting or agitating the oil with a purifying agent which is also operative as a wax adherent medium and then without removal of the purifying agent containing the absorbed impurities, chilling the mass and filtering at a temperature below the melting point of paraffin wax. By so doing the same material which acts as a purifying agent in one purifying operation may act as the wax adherent medium in the dewaxing operation, thus providing a process in which a plurality of different purifying actions are accomplished on the oil by the same agent at practically the cost of effecting one purifying action.

In carrying out the operation of this process, various petroleum oils or distillates may be used which have been distilled or reduced to any desired viscosity or have been acid treated. Also in certain instances, it may be desirable to add a diluent or cutter stock for which any suitable solvent, such as naphtha, gasoline, alcohol or the like may be used, in order to reduce the viscosity of the oil to facilitate certain operations. This diluent or cutter stock, of course, does not in all cases have to be separately added to the petroleum distillate, as a distillate may be selected in which the lower boiling point hydrocarbons have been retained.

A preferred embodiment of the invention may be described by reference to the accompanying diagrammatical drawings, which illustrate an apparatus by which the invention may be practiced in conjunction with a purifying operation upon the oil, such as the process of clarifying and improving the color of lubricating oils disclosed in United State Letters Patent No. 1,404,374 and 1,404,375.

In the drawing, 2 represents a storage tank for the oil to be treated. This tank is connected by pipe 3 with a treating tank 4. 53 is a hopper controlled by valve 54. The tank 4 is provided with a vapor outlet 5. Pipe 6 connects the tank 4 with a pump 7, which discharges through a pipe 8 connected through a valve 9 to a heater 10, and through a valve 11 to a cooler 12. The heater 10 is connected by means of a pipe 13 to a treating tank 4. As shown in the drawing, the heater 10 is also connected by a pipe 14 to the pump 7. 15 represents a valve in the pipe 14, and 16 represents a valve in a pipe 6.

The cooler 12 is connected to a water jacketed receiver 17 by a pipe 18. 55 is a stirring device, consisting of paddles connected to a shaft, which is operated by a belt pulley 21 and a motor not shown. 20 is a valve with a pipe leading to a source of diluent stock not shown. 22 is a hopper, controlled by a slide 23. 26 is a pipe connecting a receiver 17 to a pump 28, which discharges through a chiller 30, the flow being controlled by valves 25, 27 and 31. 29 is a pipe leading from the chiller back to the suction side of a pump 28, controlled by valves 31 and 27.

32 is a filter press, provided with a screw conveyor 24, which is connected to a wash tank 37. Pipe 39 leads from the bottom of a filter press 32 to a storage tank 40. The pipe 61 connects a diluting tank 60 to a source of diluent not shown, and is controlled by a valve 62. 59 is a pipe leading from a diluting tank 60 to the heater 33, controlled by valve 58. The heater 33 is connected to a screw conveyor 24.

56 is a stirring device, with paddles, operated by a belt from a motor (not shown). The washing tank 37 is provided with a vapor outlet pipe 36, controlled by a valve 35. The washing tank 37 is also provided with a pipe leading to sources of steam and air respectively controlled by valves 44 and 45. The washing tank 37 is connected to a cooler 43 by a pipe 42. The cooler 43 is connected by a pipe 46 to a filter press 48. The filter press 48 discharges into a hopper 50, 49 being a scraper. Pipe 47 connects the filter press 48 to a storage tank 41.

In operation, the tank 4 is filled with a predetermined quantity of petroleum oil stock of the desired viscosity, which may be an acid treated lubricating oil stock or any untreated or treated distillate and which may or may not be diluted by the addition of a diluent or cutter stock, such as naphtha, gasoline, alcohol or the like. To this stock the required amount of purifying agent and wax adherent medium is added, the agent or medium being supplied from a bin 53, controlled by a slide 54. The tank 2 contains the petroleum oil stock to be treated, which is conveyed to the pipe 3 in the treating tank 4 controlled by a valve.

The purifying agent may be employed for the purpose of first absorbing the sulpho-acids and free mineral acid which may have been left in the oil from a previous treatment of the oil such as an acid treatment. The purifying agent may thus be employed upon an acid treated oil, from which the acid sludge has been withdrawn, but which has not been neutralized, and will purify the oil by removing impurities present in the original oil and left in the oil by the acid treatment. It is preferred, however, that the first operation of the process shall be a decolorizing or clarifying action upon the oil, and the process will be described as applied to such decolorizing operation. It is intended that if it is desired to provide a purifying operation in which sulpho-acids or the like are removed, such process may be accomplished by employing a non-neutralized oil which has been acid treated and this material carried through the process in substantially the same manner. In conducting a decolorizing action the oil selected may or may not be previously acid treated and then neutralized.

It is understood that by the term "decolorizing" or "decolorizing reaction" as used in this description or the accompanying claims, reference is not necessarily made to an action or reaction in which complete decolorization is carried on, but the term "decolorization" is employed to indicate an improvement or decrease in color.

For accomplishing the decolorizing operation, or other purifying action on the petroleum oil, a mixture of petroleum oil and decolorizing agent is circulated in the treating tank 4 by means of pump 7, through the heater 10, and is raised to the temperature of a rapid decolorizing reaction, preferably above 250° F. I prefer to employ acid treated clay as the decolorizing agent, such for example as montmorillonite treated with sulphuric acid and washed with water, although various decolorizing agents may be employed.

After the mixture has been subjected to the rapid decolorizing reaction a sufficient time to carry out the decolorization of the oil to the desired degree, and before substantial oxidation occurs, the mixture is passed through the cooler 12 by means of pump 7, and proper regulation of valves 9, 11, 15 and 16. The mixture of oil in the agent is then cooled below the temperature of rapid decolorizing reaction and rapid oxidation by the cooler 12. The mixture is then conducted through pipe 18 to a water jacketed receiver 17, where the mixture is further cooled to approximately atmospheric temperature. The oil and agent are thoroughly commingled and prevented from separating in the receiver 17 by means of a stirrer 55. It is generally found desirable to add further wax adherent medium to the mixture in the receiver 17, the quantity depending upon the paraffin wax content of the oil stock being treated. Although a further added decolorizing agent may be employed for this purpose, it is preferable to employ a comminuted solid wax adherent material, not necessarily a decolorizing agent, such as a preferably diatomaceous earth or the like.

Such further wax adherent medium, when used, is introduced into the receiver 17 from the hopper 22 by opening the slide 23. After the mixture has been cooled to approximately atmospheric temperature in receiver 17, the mixture passes to the chiller 30. The chiller 30 may be of any suitable type, such, for instance, as an ammonia or sulphur dioxide refrigerator. The temperature of the mixture is reduced in the chiller 30 to below the melting point of the paraffin wax content of the oil being treated. This temperature will vary with different oils. A range of temperature between 50° and —10° F. will be available. It is understood that the paraffin wax content of the oil is substantially solidified at this state of the treatment, and disseminated through the wax adherent medium, the decolorizing agent acting in this step of the process as a wax adherent medium. If further inert material has been added, it also serves as wax adherent material.

The mixture passes from the chiller 30 to the filter press 32. The low temperature of the mixture and the solidification of its paraffin wax content greatly impede the filtration of the mixture, particularly in case where no diluent is being employed. In order to meet this condition, a relatively high pressure is built up on the mixture by means of a pressure pump 28. The necessary pressure will vary somewhat with oils of different viscosity and also with the amount of diluent added, but generally will range between 25 to 500 pounds per square inch. With a proper pressure, the mixture may be filtered in the filter press 32 to separate the oil or diluted oil and agent. The agent will maintain the solidified paraffin wax disseminated, and prevent the same coating and clogging the filter medium whereby the same might be ruptured.

The filtered petroleum oil stock will pass to the storage tank 40 through the pipe 39. It is found that after the petroleum oil has been filtered the decolorizing agent bearing the adsorbed coloring matter and any added inert wax adherent medium will maintain the solidified paraffin wax disseminated throughout its mass. This filter cake passes into the washing tank 37. Thereafter the paraffin wax may be recovered from the decolorizing agent, if desired. This may be accomplished by adding a heated, relatively low boiling point petroleum distillate, such as naphtha, lamp oil distillate, or the like, to the agent as it passes into washing tank 37.

In the tank 37 the heated low boiling point distillate, mixed with the decolorizing agent containing the paraffin wax, is agitated by mechanical means. The mixture is maintained in tank 37 until the paraffin wax dissolves in the distillate. The mixture is then passed to the filter 48, where the distillate and dissolved paraffin are separated from the decolorizing agent and adsorbed coloring matter. The distillate and dissolved paraffin wax then pass to the receiver 41.

The distillate is then distilled off and condensed by well known methods, and the paraffin wax recovered, which thereafter may be treated in any desired manner to produce commercial wax or the like. A valuable feature of practicing the invention as above set forth is found in the fact that the paraffin wax has also been clarified and decolorized during the treatment in tank 4.

It will be appreciated that by means of the above invention the lubricating oil is freed of objectionable paraffin wax. This is accomplished concurrently with the clarification and decolorization treatment of the oil. The decolorizing treatment is not retarded, and its efficiency remains unimpaired.

In the manufacture of lubricating oils having relatively low viscosities—that is, viscosities which do not exceed 330 seconds 100° F., Saybolt,—it may not be necessary to add a diluent during the decolorizing and wax extracting operation, in which case the oil emerges from the process undiluted and in all respects comparable with the product of former methods of treatment, except that the objectionable paraffin wax has been eliminated. This is made possible by appreciating and employing the facts that lubricating oils at low temperatures have practically no paraffin wax solubility, and that an ordinary comminuted decolorizing agent will maintain solidified paraffin wax disseminated, and permit filtration under high pressure at low temperature.

By this invention petroleum oil may be subjected to a plurality of purifying operations without requiring the purifying agent to be removed from the oil after each operation as the same agent is employed to effect each of the purifying operations.

The invention provides an economical and convenient means of obtaining a superior paraffin wax as a by-product of the treatment of petroleum oils.

This application is a continuation in part of my application Serial No. 511,546, filed October 31, 1921.

The invention is not limited to the specific embodiment above set forth as an example to illustrate a preferred process, but is of the scope set forth in the following claims.

I claim:

1. The process of treating mineral lubricating oils containing wax to effect both a decolorization thereof and a lowering of the cold test thru the aid of a single substance, which includes treating the lubricating oil with a comminuted decolorizing agent at a temperature not substantially less than 250° F. to effect a decolorizing of the oil, then cooling the mixture below the melting point of paraffin wax to congeal the wax throughout the decolorizing agent, and filtering the oil, below the melting point of paraffin wax, from the solid mass.

2. A method of separating paraffin wax from mineral lubricating oil containing the same, which consists in mixing the oil with a comminuted decolorizing agent, cooling the mixture below the melting point of paraffin wax, filtering said mixture under a pressure in excess of 25 lbs per square inch, and below the melting point of paraffin wax, and separating the paraffin wax from the filtered material.

3. A method of treating mineral lubricating oils containing paraffin wax, which consists in mixing the oil with a comminuted decolorizing agent, maintaining the mixture of oil and agent at a temperature to effect a decolorizing reaction, cooling the mixture below the melting point of paraffin wax, and filtering the mixture below the melting point of paraffin wax to separate the oil from the agent, adsorbed coloring matter and paraffin wax.

4. A method of treating mineral lubricating oil, which consists in mixing the oil with a comminuted clay, maintaining the mixture of oil and clay at a temperature to effect a decolorizing reaction, cooling the mixture below the melting point of paraffin wax, and filtering the oil under pressure below the melting point of paraffin wax.

5. A method of decolorizing mineral lubricating oils, containing paraffin wax, and separating the wax therefrom which consists in commingling the oil with a comminuted decolorizing agent, maintaining the mixture at a temperature to effect a decolorizing reaction, cooling the mixture below the melting point of paraffin wax, filtering the oil under pressure and below the melting point of paraffin wax, and separating the filtered paraffin wax from the decolorizing agent.

6. A method of treating mineral lubricating oil containing wax, which consists in mixing the oil with a comminuted decolorizing and wax adherent medium, maintaining the mixture of oil and said medium at a temperature to effect a decolorizing reaction, cooling the mixture below the melting point of paraffin wax, and filtering the mixture below the melting point of paraffin wax to separate the oil from the solid mass.

7. A method of treating petroleum oil containing wax, which comprises mixing the oil with a quantity of comminuted decolorizing wax adherent medium substantially sufficient only to decolorize the oil and additional wax-adherent medium, maintaining the oil while mixed with said decolorizing wax-adherent medium, at a temperature to effect a decolorizing reaction, cooling the mixture below the melting point of paraffin wax, and filtering the mixture below the melting point of paraffin wax to separate the oil from the solid mass.

8. The process of treating mineral lubricating oils containing wax to effect both a lowering of the cold test and a purifying action through the aid of a purifying and wax-adherent medium, which includes treating the lubricating oil with a comminuted purifying and wax-adherent medium at a temperature above the melting point of paraffin wax to effect a purifying action, then cooling the mixture below the melting point of paraffin wax to congeal the wax throughout the purifying and wax-adherent medium, and filtering the mixture below the melting point of paraffin wax to separate the oil from the solid mass.

9. The process of treating petroleum oils containing wax to effect both a decolorization thereof and a lowering of the cold test, through the aid of a comminuted decolorizing and wax adherent medium and a comminuted non-decolorizing wax adherent medium, which includes treating the petroleum oil with the comminuted decolorizing and wax adherent medium at a temperature not substantially less than 250° F. to effect a decolorization of the petroleum oil, cooling below the point of rapid oxidization, adding thereto a comminuted solid non-decolorizing wax adherent medium, then chilling the mixture below the melting point of paraffin wax, and filtering, the quantity of decolorizing wax adherent medium mixed with the oil being sufficient to decolorize the oil but not sufficient without the presence of the additional wax adherent material to permit the filtration of the mixture for the separation of the congealed wax.

10. A process of treating petroleum oil containing wax, which includes mixing the oil with a comminuted decolorizing and wax adherent medium, maintaining the mixture at a temperature for effecting a decolorizing reaction, adding diatomaceous earth to the mixture, cooling the mixture below the melting point of paraffin wax and filtering the mixture below the melting point of paraffin wax to separate the oil from the solid mass, the quantity of decolorizing wax adherent medium mixed with the oil being sufficient to decolorize the oil but not sufficient without the addition of the diatomaceous earth to permit the filtration of the mixture for the separation of the congealed wax.

11. The process of dewaxing hydrocarbons containing wax by utilizing in a spent condition a comminuted material previously used in decolorizing hydrocarbons, which consists in mixing said material with liquid hydrocarbons containing the wax, chilling the said mixture of liquid hydrocarbons and spent comminuted material below the melting point of the wax, the hydrocarbons other than the wax portions remaining liquid, then separating the uncongealed hydrocarbons from the wax and comminuted material.

12. The process of dewaxing hydrocarbons containing wax by utilizing a comminuted material previously used in decolorizing hydrocarbons which consists in combining the hydrocarbons containing the wax with said previously used comminuted material while still in a spent condition and a diluent miscible with the hydrocarbons, chilling the mixture thus produced to congeal the wax upon the comminuted material, the hydrocarbons other than the wax remaining liquid and then separating the chilled associated wax and comminuted material from the liquid mass.

Signed at Fillmore, Calif., this 9th day of May 1924.

JAMES W. WEIR.